3,574,632
PROCESS OF PREPARING A PELLETED ANIMAL
FOOD FREE OF PATHOGENIC BACTERIA
George T. Lanz, Kirkwood, Mo., assignor to Ralston
Purina Company, St. Louis, Mo.
Continuation-in-part of application Ser. No. 480,015,
Aug. 16, 1965. This application Aug. 8, 1969,
Ser. No. 858,235
Int. Cl. A23k 1/20
U.S. Cl. 99—2          1 Claim

ABSTRACT OF THE DISCLOSURE

Meal which is to be pelleted is introduced into a pressure chamber where a predetermined amount of moisture is added to the meal as it is agitated and advanced through the chamber. The moistened meal is heated in the chamber to a predetermined temperature and retained therein for a sufficient length of time to effect destruction of substantially all the bacterial organisms in the meal with a minimum destruction of the nutritional value of the meal by avoiding cooking. Pelleting is accomplished by a ring-type pellet mill which augments said destruction without cooking.

---

This application is a continuation-in-part of my copending application, Ser. No. 480,015, filed Aug. 16, 1965, now abandoned.

This invention relates to the preparation of food, and with regard to certain more specific features, to the preparation of pelleted animal feed which is substantially free of pathogenic bacteria such as salmonella serotypes.

Among the several objects of the invention may be noted the provision of a low-cost method and apparatus for producing pelleted food, and more particularly pelleted animal feed, which is substantially free of pathogenic bacteria such as salmonella; and the provision of a method and apparatus of the class described which conserve the nutritional value of the raw materials from which the pelleted end product is made. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claim.

In the accompanying drawings, in which one of various possible embodiments of the invention is illustrated, FIG. 1 is a diagrammatic view illustrating apparatus for performing the process;

FIG. 3 is an end elevation of an outlet pressure lock;

FIG. 4 is a cross section taken on line 4—4 of FIG. 3;

FIG. 5 is a cross section taken on line 5—5 of FIG. 4;

Corresponding reference characters indicate corresponding parts throughout the several views of the drawings.

Pathogenic bacterial contamination of food, and particularly pelleted animal feeds, presents problems, particularly in regard to contamination by salmonella serotypes. Suggestions have been made to irradiate such animal feeds to eliminate such pathogenic bacteria, but this is not a practical solution because of cost. The usual screw-type extrusion machinery used for pelleting produces comparatively high temperatures in the presence of moisture during pelleting. Such apparatus is capable by heating of eliminating some bacterial contamination, but its application of high temperatures is quite short and hence the degree of bacterial destruction is not sufficient. Moreover, the high temperature, when applied even for the short times involved, tends to destroy nutritional values of the food. Also, such screw-type extrusion machinery for the purpose is costly.

So-called ring-type pellet mills for pelleting are not as costly to operate as are extruders. As will appear, these also extrude under some, but lower pressures in order to pelletize. Their operating conditions preserve nutritional values. They are not capable of any adequate bacteria destruction when used independently but have enough bacteria destroying effect to make them important as a part of the present invention for killing the salmonella variety of bacteria. According to the present invention, such pellet mills are employed, augmented by suitable pretreating means for the supply of raw materials. The pretreating means is such as will in most cases of salmonella contamination ensure substantial bacterial destruction without substantial deterioration in nutritional values.

Figure 1:
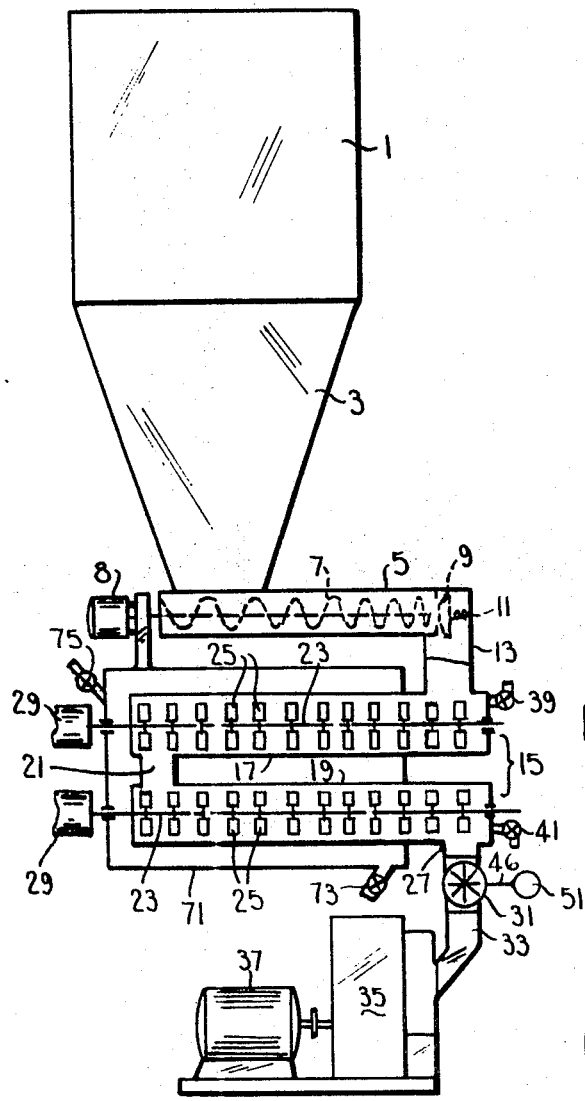

Referring now more particularly to FIG. 1, there is shown at numeral 1 a supply bin for the raw feed materials to be processed. The materials are the appropriate ones in the usual dry meal form for producing the type of feed desired, such as animal, poultry or like feed. Appropriate farinaceous and proteinaceous mixtures are well known in the art and require no further description.

The dry meal gravitates downwardly through a chute 3 to a tube 5 in which is a conveyor screw 7, preferably of the variable-pitch type. Screw 7 has a variable-speed drive 8. The variable pitch of screw 7 is not always necessary but is preferred, to obtain a desirable full and tightly compacted flow of material through tube 5. The tube 5 is provided at the discharge end of the screw 7 with a spring-biased poppet valve 9 which exerts pressure on the discharging dry meal. The biasing spring is numbered 11 (see also FIG. 2). Valve 9 acts as an inlet check valve preventing loss of pressure on its downstream side. When the valve is open, loss of pressure is inhibited by the packed condition of the meal passing through it.

At numeral 13 is shown an outlet from the downstream-side of the poppet valve 9 for carrying the compressed dry meal to the upper reach of a dougle-reach cascade-type pressure chamber 15. Its reversely extending sections or reaches are numbered 17 and 19. The outlet 13 is connected to one end of the upper reach 17. The other ends of the reaches 17 and 19 have a cross connection at 21.

Figure 2:
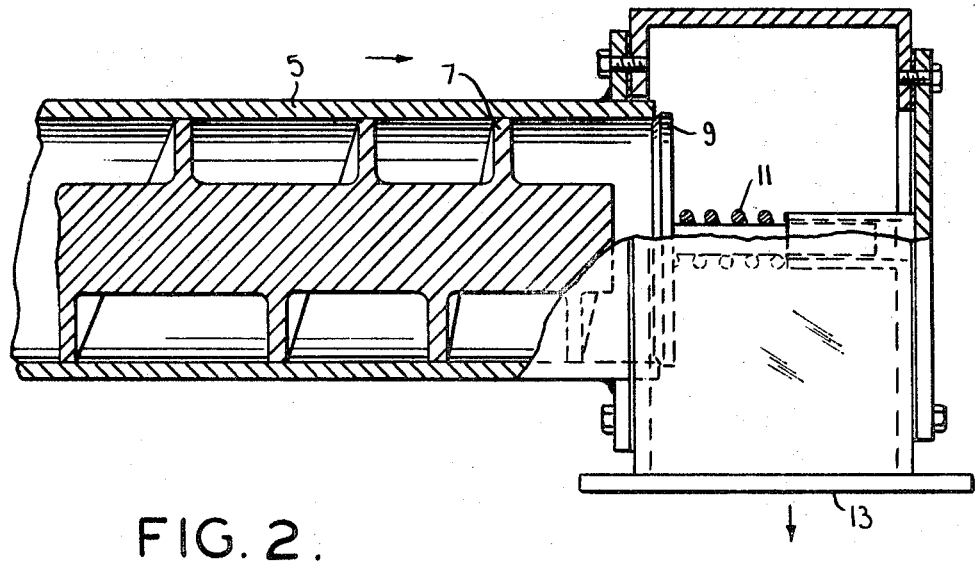
FIG. 2 is a broken cross section showing part of a feed screw and a poppet valve.

Each reach 17 and 19 is in the form of a tube surrounding a shaft 23 which carries angled paddles 25. The paddles in reach 17 are angled to stir and drive material from the inlet 13 to the connection 21; and those in reach 19 are angled to stir and drive material from the connection 21 to an outlet 27 of the tube 19. At numerals 29 are shown variable-speed drives for the shafts 23. At numeral 31 is shown a rotary back-pressure lock (see also FIGS. 3-5) which transfers material from the outlet 27 to an inlet 33 of a pellet mill 35 having a motor drive 37. Lock 31 is of the rotary vane type. FIG. 2 shows details for mounting of the poppet valve 9, its spring 11 and the adjacent end of screw 7. Like numerals designate parts like those shown in FIG. 1. Valve 9 functions as an inlet pressure lock.

At numeral 39 is indicated a controlled inlet, and at 41 a controlled outlet for circulating steam under pressure through the preparation chamber 15. The steam raises the moisture content by condensation and also raises the pressure on the meal. The locks 9 and 31 maintain pressure on the material in chamber 15 as established by the steam admitted at 39.

FIG. 3 further illustrates the outlet pressure lock 31. This comprises a body having a vertical passage 43 and a transverse bore 45. In the transverse bore 45 is a rotor 44 having blades 47 providing spaces 49 therebetween in which material is received from the outlet 27 and transferred to the inlet 33 of the pellet mill 35. The rotor is carried on a shaft 46. The blades 47 form a substantial seal against loss of any pressure maintained in the chamber 15. A suitable variable-speed drive, indicated diagrammatically at 51 in FIG. 1, is provided for rotating the blades 47.

At numeral 71 is shown a steam jacket surrounding substantial portions of the reaches 17 and 19. This has a steam inlet 73 and a steam outlet 75. Its purpose is indirectly to supply additional heat when needed to material in the reaches 17 and 19. It will be understood in this connection that other means than jacket 71 may be used if desired for indirectly applying heat to raise the temperature in reaches 17 and 19.

Figure 6:
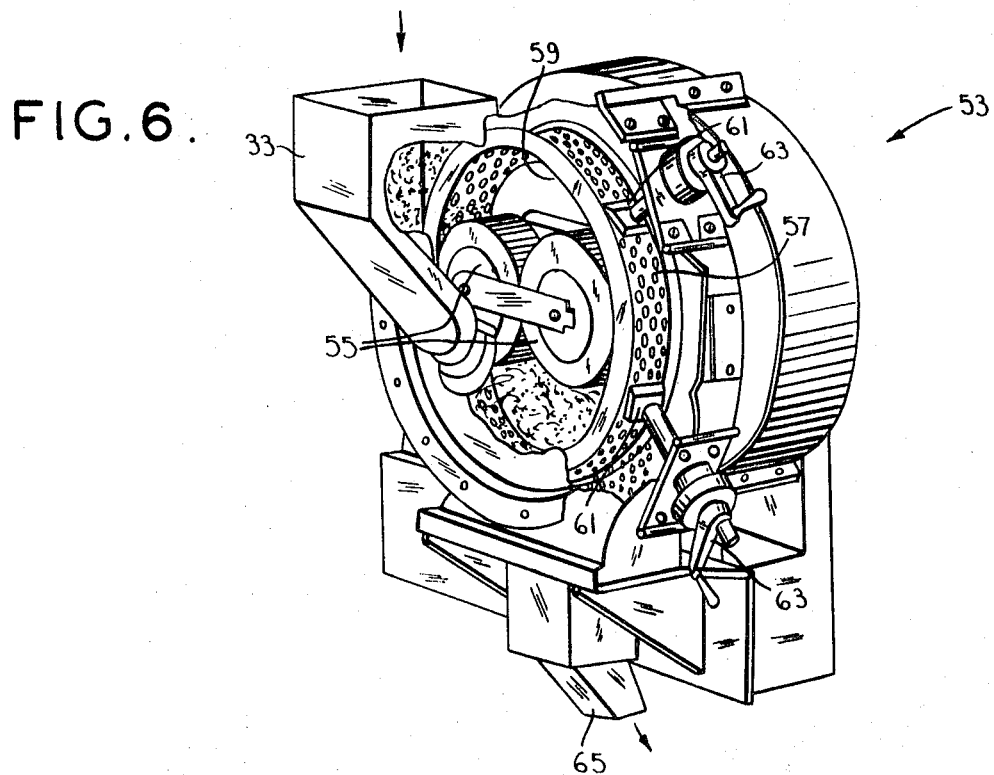
FIG. 6 is an isometric view illustrating the die and rollers of a pellet mill employed in the process.

FIG. 6 illustrates a pelleting head 53 of an appropriate pellet mill 35. This comprises a set of fixed-center rolls 55, the surfaces of which are serrated and make internal contact with a perforated ring-shaped die 57 driven by the motor 37. The die 57 has an open end 59 through which material is received from the inlet 33 and placed on the interior of the die. At numerals 61 are shown doctor blades contacting the exterior surface of the die 57. Upon feeding material into the die 57 and rotating it, the rolls 55 squeeze the material in rope form out through the openings in the die, to be cut into pellets by the doctor blades 61. The rolls 55 turn at the same peripheral speed as the die 57, being driven by friction between the material, the rolls 55 and the die 57. Suitable adjusting means for the doctor blades are shown at 63. The finished pellets leave the mill 35 through an outlet 65 for drying, packaging and shipping.

Figure 7:
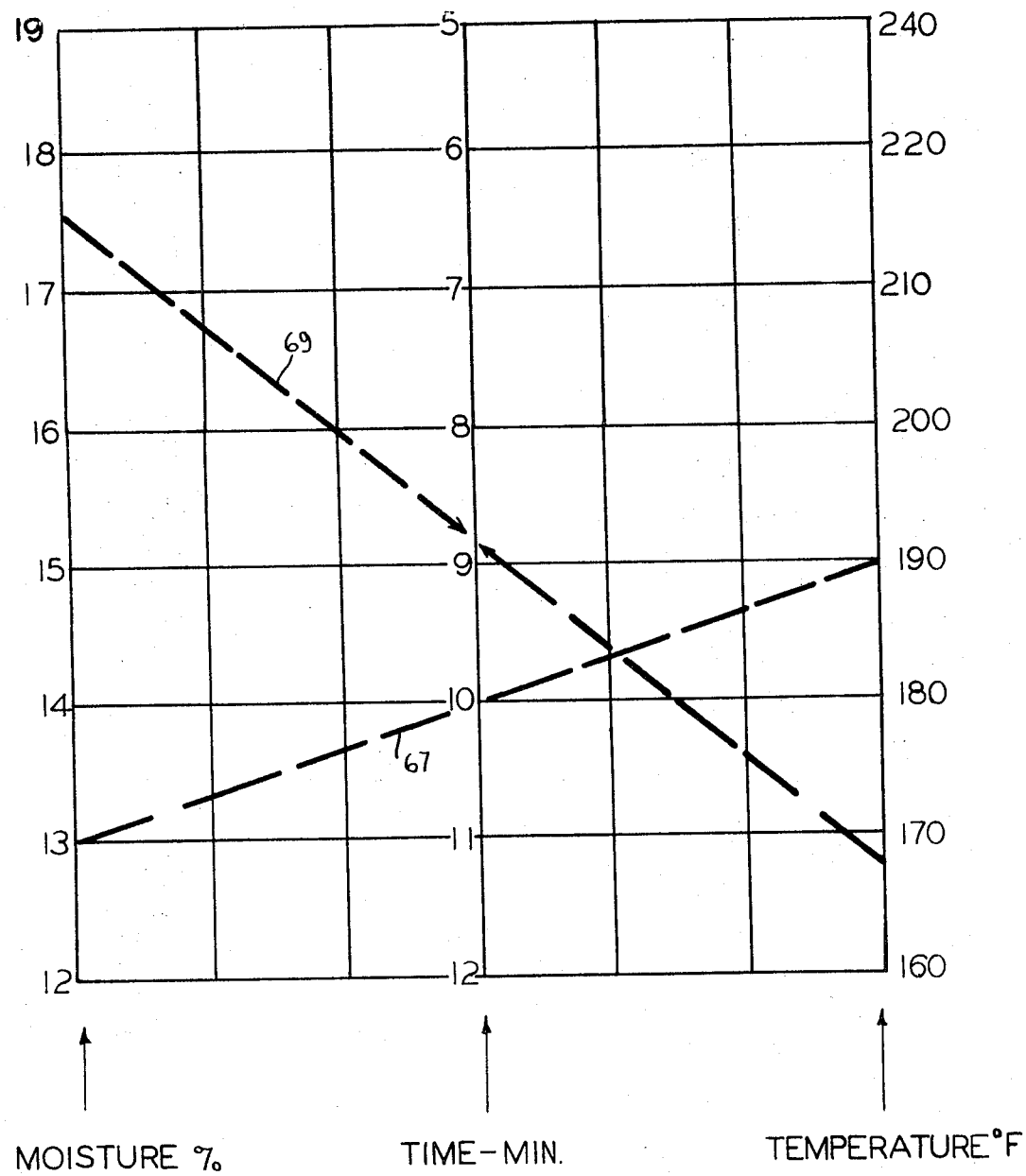
FIG. 7 is a nomograph illustrating certain moisture, time and temperature parameters employed in the process.

In FIG. 7 is shown one of a number of appropriate nomographs for depicting the moisture-time-temperature relationships to be maintained in the chamber 15 for killing bacteria. Such a nomograph is prepared on the basis of the bacterial count found per gram of the dry meal in the supply bin 1. The nomograph shown is for a bacterial count of $8 \times 10^7$ salmonella organisms per gram which is the maximum to be reasonably expected. The nomograph shows as ordinates the three independent variables, i.e., moisture in percent, time in minutes and temperature in degrees F. Known relationships between values of these are the parameters for adequate bacterial kill. By selecting values on any two of the ordinates, a third value can be found on the third ordinate by drawing a line through the former. Thus if, as shown by line 67, 13% moisture and 190° F. of temperature are decided upon, the heating time required under such conditions is 10 minutes. Line 69 shows another set of conditions and, as is obvious, there will be an indeterminate number of lines such as 67 and 69 that might be drawn to make various determinations of moisture, time and temperature to be used. If other organisms are to be dealt with, other nomographs will be used for their maximum numbers reasonably to be expected. If the numbers of a given organism vary below the numbers reasonably to be expected, the appropriate nomograph for that organism may be used, because if a given set of conditions will kill the maximum number they will kill less than the maximum number. This does not preclude the preparation of particular nomographs for the smaller numbers, if desired.

Operation is as follows:

A bacterial count is taken of the meal in the supply bin 1 and an appropriate nomograph is prepared, as shown in FIG. 5, which relate the percentages of moisture, times in minutes and temperatures in degrees F. required in the chamber 15 for a substantially complete salmonella kill without developing a cooking operation therein. The dry material gravitates into the tube 5 and is driven from the chute 3 to the check valve 9 via the screw 7, which is driven from the drive 8. A full flow is maintained in tube 5. The material passing through valve 9 becomes pressurized and is moistened as it proceeds from the outlet 13. It is then driven to the left through reach 17 wherein it is continuously stirred under the selected pressure and moisture content by paddles 25. It then passes through the connection 21 and the reach 19, being continuously stirred by the paddles 25 in the latter under said pressure and moisture content. The steam admitted to the chamber 15 at 39 and out through the outlet 41 supplies the selected pressure, moisture content and all or some of the heating required for raising the temperature. The drives 29 of the shafts 23 are adjusted in speed to carry the material through the chamber in the correct time, according to the nomograph. The screw 7 is driven at a rate to pack the dry material at the inlet to the valve 9, so that when the valve 9 is open, undesirable loss of back-pressure in chamber 15 will not occur.

The material cascading through the reaches 17 and 19 of the chamber 15 becomes moistened by condensation of steam entering at 39. The amount of this steam is such as to supply the percentage of moisture dictated by the nomograph (FIG. 7). Since this steam may not be at a temperature sufficient to meet the temperature dictated by the nomograph, additional heating may be required and is accomplished by means of the steam heating jacket 71, the temperature of which is controlled to bring the temperature within the chamber 15 to the desired killing value but not high enough to bring about cooking. The time during which the moist material is heated and stirred in the reaches 17 and 19 is obtained from the nomograph and determined by the speeds of the drives 29. The relationship of this timing with respect to the moisture and temperature selected is important to provide a sufficiently long period of steaming to expose a sufficient number of the bacterial organisms to the killing action of the moist heat. The moisture aids in carrying the killing temperature to the organisms. The moisture also dampens the dry meal sufficiently that by the time it reaches the pellet mill 35, it is in condition to be pressed through the openings of the die 57 into rope-like form, to be cut off into pellets by the doctor knives 61. Thereafter it dries or is dried.

It is important that the temperature and timing be limited to the killing values and should not be such as to cook the moist material. The purpose of avoiding cooking in the chamber 15 is to avoid any substantial deterioration in the nutritional value of the product by protein destruction (among other things), which cooking causes. In this connection it will also be understood that the pellet mill such as 35, as distinguished from a screw-type extruder, does not bring about cooking. Its use in combination with the chamber 15 aids in producing complete kills even of very heat-resistant strains of salmonella. In many cases the amount of steam entering at 39 to supply the proper amount of condensate for moisturizing will be sufficient to bring the temperature within the reaches 17 and 19 up to the value dictated by the nomograph. In such cases the additional heat supplied by the steam passing through the jacket 71 will not be required.

Briefly, then, the invention provides a hot, moist medium applied under proper pressure for a sufficient time to substantially completely kill the bacterial organisms without damage to the food value by cooking. Some of the varieties or strains of these organisms are more heat-resistant than others, and the design of the equipment provides considerable latitude in the selection of moisture content, temperature, and retention time for a satisfactory kill. By cascading the material in the tubular reaches 17 and 19 of the chamber 15, a retention time of several minutes is available. The arrangement also permits the use of the low-cost pellet mill, rather than an extruder, for pelleting. While a conventional extruder provides for atmospheric steaming of the material as it approaches the pellet die, its time available for steaming is a matter of seconds and occurs at high temperatures, introducing a cooking effect, whereas according to the present invention the retention time under proper conditions of moisture and temperature is a matter of minutes, but without cooking, either in the chamber 15 or in the pellet mill 35.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The continuous process of preparing reliably completely Salmonella-free pelleted food from proteinaceous and farinaceous meal, comprising:
   continuously moving the meal through a pressure-confining region at a variable but controlled rate of speed;
   stirring the moving meal in said region;
   introducing steam under pressure into said region to pressurize and moisture the moving and stirred meal while heating it to raise its temperature;
   the temperature reached by the meal in said region and the amount of the moisturization thereof by said steam being controlled by its time in said region to kill most if not all Salmonella therein without substantial reduction of food value, said time being determined by said speed;
   said speed being selected to maintain the meal in said region for a period in the range of approximately 5–12 minutes to attain a moisture content in the range of approximately 12–19% and a temperature in the range of approximately 160–240° F., the particular relationships between time, moisture content and temperature being selected in accordance with formulations exhibited by the nomograph of FIG. 7; and
   pelleting the meal in a roll and die type pellet mill after leaving said region to force the moist meal through its dies for pelleting thereby to ensure a complete kill of all Salmonella without substantial deterioration of food value.

References Cited

UNITED STATES PATENTS 3,159,493  12/1964  Japikse et al. _____ 99—216
3,159,494  12/1964  Lawrence _____ 99—216

OTHER REFERENCES

Simmons, Feed Milling, Leonard Hill (Books) Ltd., 2nd ed., 1963, pp. 195, 106, 107, 187, 197.

RAYMOND N. JONES, Primary Examiner

J. N. HUNTER, Assistant Examiner